Patented Feb. 20, 1940

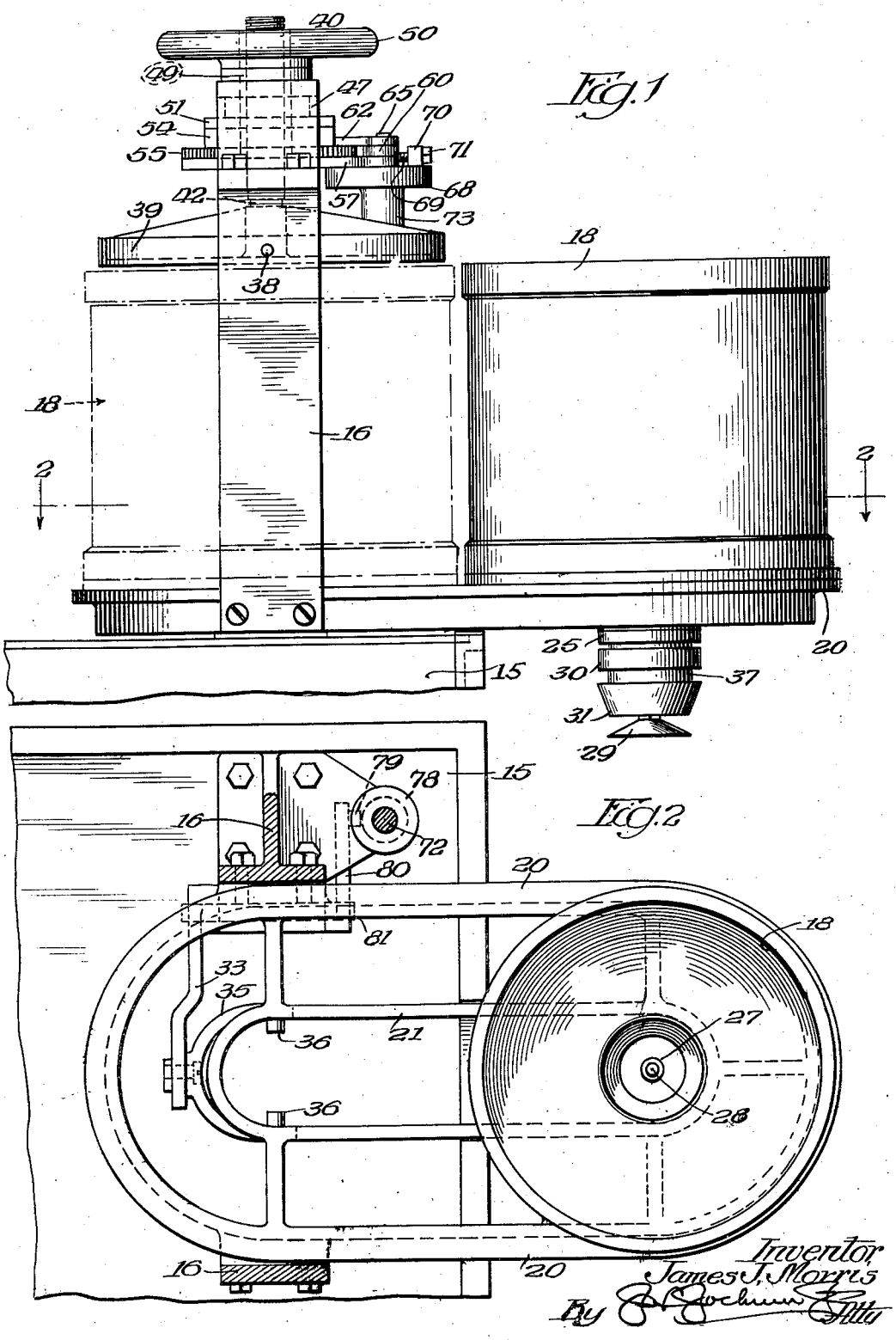

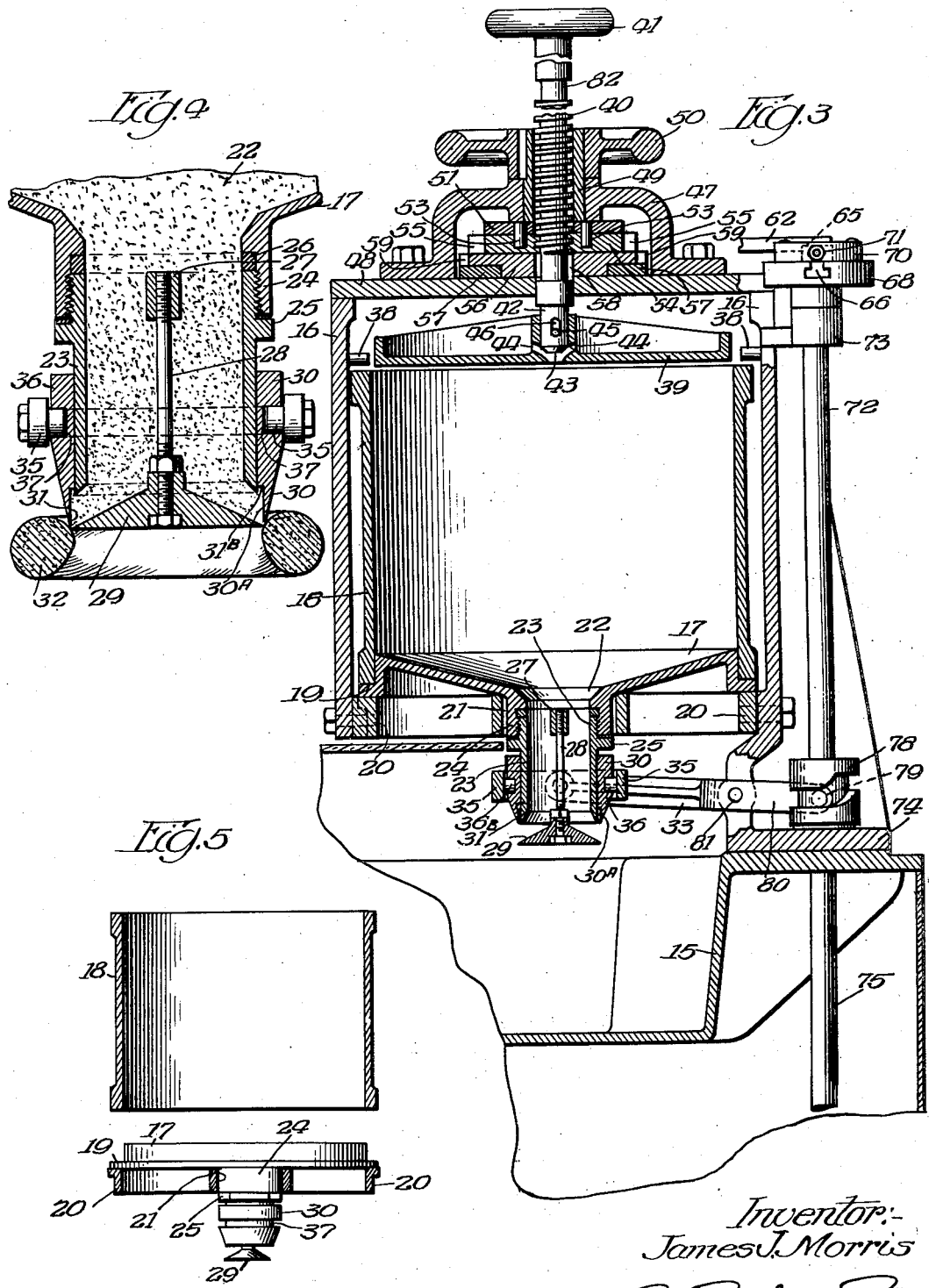

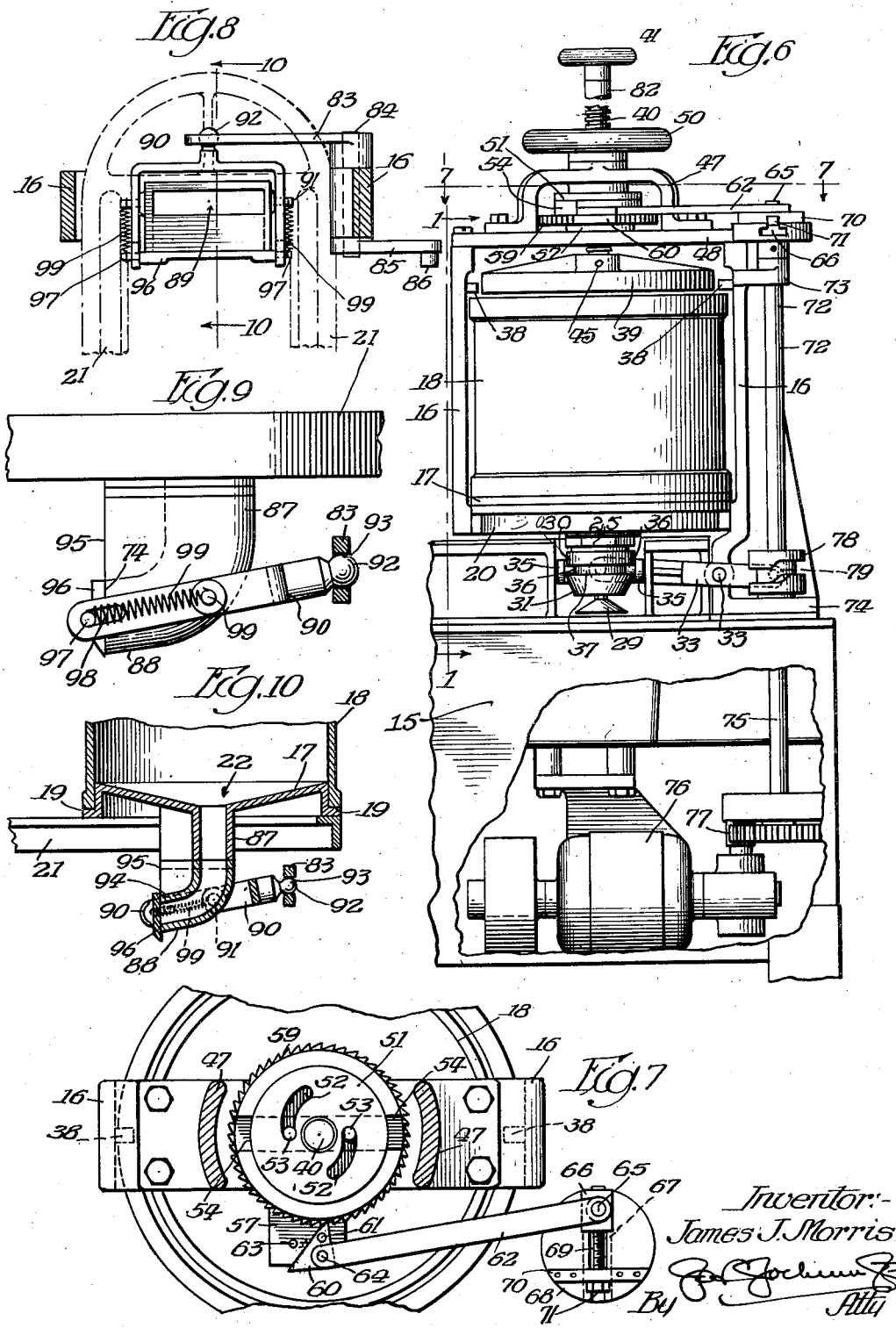

2,191,286

UNITED STATES PATENT OFFICE 2,191,286

COOKING APPARATUS

James J. Morris, Chicago, Ill., assignor to Theodore J. Morris, Chicago, Ill.

Application December 30, 1937, Serial No. 182,537

9 Claims. (Cl. 107—14)

This application is a continuation in part of my original application Serial #138,761 filed April 24, 1937.

The present invention relates in general to cooking apparatus, but more specifically to doughnut making machines and particularly to the mechanism for forming the dough into the desired shape.

One of the objects of the invention is to provide improved forming and cutting mechanism and improved means for advancing or forcing the material or dough through the forming means into position to be severed from the supply by the cutting mechanism.

A further object is to provide an improved cutting mechanism, and improved means for intermittently advancing the dough feeding means.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view in side elevation of a dough forming and feeding mechanism constructed in accordance with the principles of this invention and with parts omitted, and showing in section a portion of the cooking receiver or tank and showing some of the parts in different positions, and as taken generally on the line 1—1 Figure 6.

Figure 2 is a detail sectional view taken on line 2—2 Figure 1.

Figure 3 is a vertical sectional view of the dough feeding and forming mechanism.

Figure 4 is an enlarged detail sectional view of the dough forming spout and cutter mechanism, similar to that shown in Figure 3, and showing a doughnut as being formed.

Figure 5 is a detail sectional view of the hopper and the throat mechanism showing the parts of the hopper separated.

Figure 6 is a side elevation of the hopper, also showing a portion of the cooking receiver or tank and the operating mechanism for actuating the dough feeding means.

Figure 7 is a detail horizontal sectional view, on an enlarged scale, taken on line 7—7 Figure 6.

Figure 8 is a detail plan view of another form of cutting mechanism.

Figure 9 is a side elevation of Figure 8.

Figure 10 is a detail sectional view taken on line 10—10 Figure 8.

Referring more particularly to the drawings, the numeral 15 designates generally a cooking receptacle or tank, a portion only of which is shown, and above which cooking receptacle the dough feeding or extruding mechanism is arranged so as to deposit the article therefrom into the cooking receptacle.

Projecting above the receptacle 15 and supported in any suitable manner is a frame 16 which is stationary and may be of any desired or suitable construction being open at its front and rear. A hopper or container is arranged within the frame and preferably comprises a bottom 17 and a body portion 18 formed separate from each other.

The body portion is tubular and is open at its top and bottom and the bottom element is provided with a circumferential seat 19 disposed below the upper surface of the bottom. The diameter of the body portion 18 is slightly larger than the external diameter of the bottom 17 above the seat 19 so that one end of the body may be telescoped over a portion of the bottom 17 to rest upon the seat 19, thereby rendering it possible to readily separate these parts when it is desired.

The hopper or container thus formed is arranged within the frame 16 and is adapted to slide upon suitable guides 20. These guides project for a suitable or desired distance laterally beyond the sides of the receiver 15 and are preferably in the form of a framework having an open or slotted portion 21 disposed substantially centrally thereof.

The bottom 17 of the container is inclined or of an inverted conical configuration and is provided with a discharge outlet 22 with a depending throat 23 preferably removably connected thereto and which throat projects through and is movable in the open slotted portion 21. The throat may be of any suitable construction but is preferably tubular having an end provided with threads engaging in threads in a flange 24 which encompasses the discharge outlet 22.

An annular flange 25 may be provided upon the throat if desired, to form a stop for a purpose to be described.

A grid 26 may be provided and positioned between the end of the throat 23 and the flange 24. Secured to the grid in any suitable manner such as by means of one end thereof being threaded into a bearing 27 is a rod 28 of a length to project for any desired distance beyond the free end of the throat 23. Secured to this free end of the rod 28 in any suitable manner, is a conical member 29, the base of which is of a diameter substantially equal to the external diameter of the throat 23.

A sleeve 30 is reciprocable upon the throat 23, the lower end of which sleeve is reduced as at 31 to form a knife or cutting edge which co-operates with the peripheral portion of the conical member 29 to sever the dough or material 32 which is forced from the throat 23 between the lower extremity thereof and the adjacent portion of the conical member 29, as shown more clearly in Figure 4.

The lower end of the sleeve is undercut as at 30A to provide a shoulder 31B, the inner diameter of the sleeve below said shoulder being just slightly larger than the larger diameter of the conical member 29 to co-operate therewith so as to sever the material.

The shoulder 31B, however, when the sleeve is in its lowermost position will engage and rest upon the peripheral edge of the conical member to be supported thereby and will be prevented from dropping it too far.

This is advantageous, as this construction will insure that the space between the lower edge of the sleeve and the peripheral edge of the conical member will be closed when filling the hopper, and the material will be prevented from escaping or running out until it is forced out by the plunger 39 when the sleeve 30 is raised.

The sleeve 30 is reciprocable upon the throat 23 by means of a lever 33 (see particularly Figures 2 and 6) pivotally supported intermediate its ends as at 34, and its movement in one direction is arrested by the flange 25. To one end of this lever 33 is connected an open yoke 35 having pins 36 which project into an open peripheral groove 37 in the sleeve. The open portion of the yoke 35 is faced in the direction of the extended portions of the guide 20 upon which the container 18 moves, so that when the latter is moved from a position where the throat discharges into the receiver 15 (as shown in dotted lines in Figure 1) to the position shown in full lines in Figures 1 and 2, the sleeve 30 together with the throat 23 will be moved out of the yoke 35 so as not to interfere with such movement of the container.

The container is moved to this position so as to permit a refilling of the same.

When the container is then moved back to the position shown in Figure 3 and in dotted lines in Figure 1, the pins or projections 36 on the yoke 35 will enter the groove 37.

When the container is in this latter position and in order to maintain the body 18 of the container against separation with respect to the bottom 17 thereof, the upper edge of the body portion 18 passes beneath pins or projections 38 (see Figure 3) on the upright or frame 16.

A plunger 39 is provided for operating in the container 18 to eject or force the material therefrom through the discharge outlet 22. This plunger is preferably supported by means of a non-rotatable screw 40 provided with a handle or lifting knob 41. The lower end of the screw is preferably reduced as at 42 and the extremity of the reduced portion is shaped to form a valve 43 adapted to control openings 44 through the plunger. Connection between the plunger 39 and the screw 40 may be made in any suitable manner such as by means of a pin 45 engaging the plunger and passing through a slot 46 in the reduced end 42 of the screw 40.

A yoke or bearing 47 is supported by the cross member 48 of the frame 16 and within this yoke or bearing is an upright rotatable unthreaded sleeve or member 49 to which is connected a hand wheel 50 which latter rests upon the yoke 47 and forms a support for the member 49.

Connected to the sleeve 49 so as to rotate therewith is a disc 51 provided with slots 52 (see particularly Figures 3 and 7) into which pins 53 project. These pins are secured to co-operating members 54 that are movable in a slot 55 in a member 56, the latter being supported for rotation upon a bearing member 57, mounted upon the member 48, and is provided with an unthreaded opening 58 through which the screw 40 loosely passes. The inner faces of the nut members 54 are provided with threads adapted to engage in the threads of the screw 40 so that when the member 56 is rotated, in a manner to be described, the nut members 54 will also be rotated while the screw 40 is maintained against rotation. The result will be that upon rotation of the member 56 the screw 40 will be moved longitudinally and the plunger 39 advanced or retracted according to the direction of rotation of the member 56.

The hand wheel 50 is provided so as to move the nut members 54 toward and away from each other. This will be accomplished by reason of the fact that when the member 51 which contains the slots 52 is rotated by means of the hand wheel 50, the pins 53 rotating in these slots will cause the members 54 to be moved towards each other into engagement with the screw 40 so as to advance the plunger 39, or to move away from each other so as to separate the members 54 causing them to disengage the threads of the screw 40, thereby permitting the plunger 39 to be raised by means of the handle 41 with respect to the container 18, the pins or lugs 38 at this time serving to hold the body portion 18 of the container against separation with respect to the bottom 17 thereof.

When the plunger 39 is forced downwardly into the container 18 the material will be extruded or forced therefrom, and when all of the material has been discharged the plunger 39 may be raised by the handle 41.

Inasmuch as the plunger closely fits the container 18 it will be manifest that ordinarily a suction will be created by the raising of the plunger within the container.

In order to break this suction the valve 43 and the openings 44 in the plunger are provided.

As the plunger is raised by the handle 41 the lower end of the slot 46 will engage the pin 45 and the valve 43 will be unseated with respect to the openings 44. When, however, the plunger 39 is lowered, its lowering movement being resisted by the contents of the container 18, the valve 43 will be seated and the openings 44 will be closed.

The plunger is intermittently lowered by imparting an intermittent movement to the member 56 and this may be accomplished by means of teeth 59 on the periphery thereof (see particularly Figures 3 and 7) adapted to be engaged by a pawl 60. This pawl 60 is mounted upon an extension of the member 57 which latter forms an extension connected to the ratchet wheel or member 51, and the pawl is moved about its pivot 61 by means of a link 62. A stop device 63 is provided to limit the pivotal movement of the pawl in one direction.

By this arrangement the pawl will be first moved about its pivot 61 to engage the teeth 59 of the ratchet 51 and is then bodily advanced by the link 62 to impart one step of advancing movement to the ratchet member 51.

When, however, the link 62 is moved in the opposite direction, the pawl will first be moved about its pivot 61 to disengage the teeth 59, and will then be bodily moved with the extension 57 to another position while the ratchet member 51 remains at rest, so as to position the pawl with respect to the ratchet member 51 to impart another step of movement to the ratchet member when the pawl contacts the ratchet teeth and is itself bodily moved in the proper direction. This construction produces a noiseless pawl and ratchet mechanism.

The link 62 is pivotally connected as at 64 to the pawl and the other end thereof is connected as at 65 to a block 66 which is movable in a groove 67 in a disc 68, the block 66 being secured against movement in such groove preferably by means of a screw 69 threaded therethrough and also threaded through a bearing 70.

The end of the screw is provided with a head 71 by means of which the screw may be rotated.

By the adjustment of the block 66 through the medium of the screw 69, the block may be moved toward or away from the axis of rotation of the disc 68, and therefore by means of this adjustment of the block 66 the extent of throw of the pawl 60 will be varied and this will likewise control or vary the extent of rotation or steps of movement of the member 56.

The disc 68 is secured to a vertical shaft 72 journaled in suitable bearings 73—74 and the axis of the shaft is arranged in alinement with the axis of a power shaft 75 which latter receives its motion from a suitable motor 76 and intermediate drive connections 77.

Suitable clutches (not shown) may be provided, if desired, to control the connection of the shaft 72 with the source of power.

Carried by the shaft 72 to rotate therewith is a cam 78 in the groove of which a cam roller 79 on the free end of an arm 80 which is connected to the lever 33 operates, so that upon rotation of the shaft 72 the lever 33 will be rocked by its pivot 81 with the result that the sleeve 30 will be raised and lowered with respect to the conical member 29.

When the container 18 is to be shifted laterally out of position, that is, from the dotted line position to the full line position shown in Figure 1, the plunger 39 is first raised to the position shown in Figure 3, to permit such movement of the container.

The throat 23 in the normal position of the container 18 discharges into the cooking receptacle 15. The screw 40 is provided with a reduced or smooth portion 82 (see particularly Figure 3) which, when the plunger 39 is at the limit of its lowering movement, will receive the nut members 54 to arrest the plunger before it strikes the bottom 17 of the container. When in this position it will be manifest that any rotation of the member 56 would have no effect upon the advancing or retracting movement of the plunger and this will protect the container and arrest the movement of the plunger 39 at any predetermined distance.

In Figures 8 to 10 there is shown a modified form of cutting mechanism and in this form of the invention the lever 83 corresponds to the lever 33 and is pivotally mounted as at 84 and is provided with an arm 85, corresponding to the arm 80, and a roller which corresponds with the roller 79 in the form of the invention shown in Figure 3, this roller 86 operating in the groove of the cam member 78.

In the modified form of the invention the nozzle or throat is provided with an upright 87 and a laterally deflected portion 88, the nozzle being rectangular or angular in cross-section, as shown more clearly in Figure 8, for the purpose of producing a different shaped article, such for instance an article in the shape of a stick.

A yoke 90 is pivotally mounted as at 91 and stands aside the nozzle or throat 87. The yoke is connected to the arm or lever 83 preferably by means of a pawl or cylindrical portion 92 which enters a slot 93 in the lever 83.

The arms of the yoke project toward and terminate adjacent the outlet opening of the throat and the forward extremity of the throat is provided with a flat surface 94 which coincides with the flat surface 95 on a wall carried by or on the throat 87 to form a guideway against which the cutter 96 is held and over which it moves. The cutter is provided with projections 97 which enter slots 98 in the respective arms of the bifurcated lever or yoke 90. Springs 99 are anchored by one extremity to the projections 97 and by their other extremity to the pivots 91 and tend normally to hold the cutter 96 in contact with the front edge 94 of the extremity of the throat and the wall 95, as the cutter is reciprocated by the rocking movement imparted to the lever 83 through the medium of the intermediate arm 85.

As the cutter 96 is raised to uncover the outlet opening of the throat the plunger 39 will be forced downwardly into the container 18 and when the cutter 96 is returned, the projecting portion of the dough or material extruded from the container will be severed and will fall into the cooking receiver 15.

While the preferred forms of the invention have been herein shown and described, it is to be understood that various changes may be made in the details of construction and in the combination and arrangement of the several parts, within the scope of the claims without departing from the spirit of this invention.

What is claimed as new is:

1. Dough delivering and shaping mechanism embodying a container, a discharge throat leading from the container, forming and cutting mechanism associated with said throat, a plunger for forcing the material through said throat and former, an actuating screw for advancing the plunger, and a connection between the screw and plunger, there being a vent opening in said plunger to permit entrance of air into the container to overcome suction created in the container as the plunger is moved therein in one direction, the said connection adapting the plunger and screw for relative movement in directions lengthwise of the axis of said screw, whereby the said screw will control said vent.

2. Dough delivering and shaping mechanism embodying a container, means mounting the container for bodily sliding movement into and out of active position, said container provided with a discharge throat, a forming device and a cutter both co-operating with said throat, said cutter embodying a sleeve reciprocable upon said throat, means for reciprocating the sleeve, the last said means embodying a member pivotally mounted upon a stationary support, means for rocking said member about its pivot, an open yoke at one end of the member, and projections on the yoke entering a groove in said sleeve, thereby adapting said container for bodily lateral adjustment, said sleeve moving out of said yoke during such lateral adjustment of the container.

3. Dough delivering and shaping mechanism embodying a container provided with a discharge throat, a plunger mounted upon a stationary support, a support upon which the cylinder is mounted for slidable adjustment adapting the container to be positioned beneath the plunger when the plunger may be moved thereinto and also adapting the container for sliding movement to a position out of the plane of movement of the plunger, means for advancing and retracting the plunger, shaping and cutting mechanism supported for movement with the container and cooperating with the discharge outlet end of said throat, said cutting mechanism embodying a reciprocable cutter, and means operating in timed relation with the plunger advancing means for reciprocating said cutter.

4. Dough delivering and shaping mechanism embodying a container for the material, said container embodying a tubular body open at both ends, and a bottom separate therefrom, the said bottom and the proximate end of the body telescoping but freely separable, said bottom constituting the sole support for said body, a plunger, a support for the plunger, means for advancing the plunger into said body and for withdrawing the same from the body, and means independent of and projecting over a portion of said body for maintaining the body from separation from said bottom when the plunger is being withdrawn from the container.

5. Dough delivering and shaping mechanism embodying a container for the material and provided with a depending throat, cutting mechanism adjacent the outlet end of the throat, a slide upon which the container is mounted for lateral and bodily movement, said slide provided with an elongated opening through which the throat projects and is adapted for lateral movement therein, thereby permitting said lateral movement of the container, a plunger, a stationary support for the plunger, said container adapted to be positioned under the plunger, and means for moving the plunger into and out of the container.

6. Dough feeding mechanism embodying a container for the material, said container provided with a discharge outlet, a plunger movable in the container to force the material therefrom, actuating means for advancing and for retracting the plunger, a connection between the plunger and the said actuating means, said connection embodying a vertical member loosely connected with the plunger, there being an air opening through the plunger, a portion of the said member shaped to vary said opening, said opening being closed when the plunger is advanced against the resistance of the material in the container, and said loose connection adapting the plunger and said member for relative movement to uncover said opening when the plunger is being retracted, to permit air to enter the container therethrough.

7. A dough delivering and shaping mechanism embodying a container provided with a discharge throat, the extremity of the outlet of the throat providing a flat bearing surface, a cutter contacting and movable over said surface, a pivotally mounted actuating member embodying spaced arms between which latter said throat extends, slots in said arms, projections on said cutter extending into said slots, resilient means connected with said projections and to fixed anchors, and operating to maintain said cutter against said surface, and means for rocking said actuating member.

8. A dough delivering and shaping mechanism embodying a container provided with a discharge throat, the extremity of the outlet of the throat providing a flat bearing surface, a cutter contacting and movable over said surface, a pivotally mounted actuating member embodying spaced arms between which latter said throat extends, slots in said arms, projections on said cutter extending into said slots, resilient means connected with said projections and to the pivot of said actuating member, and operating to maintain said cutter against said surface, means for rocking said actuating member, the last said means embodying a second member and a ball and slot connection between the said members.

9. A dough delivering and cutting mechanism embodying a throat through which the dough is forced, a conical member supported adjacent but spaced from the delivery end of the throat, a cutting sleeve slidably mounted on the throat and co-operating with the edge of the conical member to sever the dough, means for reciprocating the sleeve, and a shoulder on the interior of the sleeve and spaced from the edge thereof, said shoulder adapted to contact said conical member for limiting the movement of the said sleeve in one direction, said throat and sleeve constituting a removable unitary structure and said shoulder co-operating with said conical member to maintain the sleeve and throat against separation when the unit is removed.

JAMES J. MORRIS.